(12) United States Patent
Kim et al.

(10) Patent No.: US 11,450,241 B2
(45) Date of Patent: Sep. 20, 2022

(54) ELECTRONIC LABEL DEVICE HOLDER

(71) Applicant: RAINUS CO., LTD., Seongnam-si (KR)

(72) Inventors: Hyun-Hak Kim, Seongnam-si (KR); Gi-Tae Do, Seongnam-si (KR); Hyun-Hun Oh, Seongnam-si (KR); Min-Jae Ryu, Seongnam-si (KR)

(73) Assignee: RAINUS CO., LTD., Seongnam-si (KR)

( * ) Notice: Subject to any disclaimer, the term of this patent is extended or adjusted under 35 U.S.C. 154(b) by 13 days.

(21) Appl. No.: 17/024,488

(22) Filed: Sep. 17, 2020

(65) Prior Publication Data

US 2021/0090471 A1 Mar. 25, 2021

(30) Foreign Application Priority Data

Sep. 19, 2019 (KR) .................. 10-2019-0115325

(51) Int. Cl.
  *G09F 3/16* (2006.01)
  *F16B 2/22* (2006.01)
  *G09F 9/30* (2006.01)

(52) U.S. Cl.
  CPC .................. *G09F 3/16* (2013.01); *F16B 2/22* (2013.01); *G09F 9/30* (2013.01)

(58) Field of Classification Search
  CPC . G09F 3/16; G09F 3/204; G09F 3/208; F16B 2/22
  See application file for complete search history.

(56) References Cited

U.S. PATENT DOCUMENTS

| | | | | |
|---|---|---|---|---|
| 4,334,372 A | * | 6/1982 | Colmar .................. | G09F 3/204 40/511 |
| 5,553,412 A | * | 9/1996 | Briechle ................. | G09F 3/204 40/463 |

(Continued)

FOREIGN PATENT DOCUMENTS

| | | |
|---|---|---|
| EP | 2 166 529 A1 | 3/2010 |
| KR | 10-2010-0112804 A | 10/2010 |

(Continued)

OTHER PUBLICATIONS

Korean Office Action dated Aug. 27, 2020, in connection with corresponding Korean Patent Application No. 10-2019-0115325.

(Continued)

*Primary Examiner* — Gary C Hoge
(74) *Attorney, Agent, or Firm* — Hauptman Ham, LLP

(57) ABSTRACT

A holder for holding an electronic label device includes a body; a first coupler including a top horizontal extension and a pressing portion extending from the top horizontal extension in a front direction at a predetermined curvature; a second coupler extending in a horizontal direction and protruding from a top of the body in a front direction, wherein the second coupler is spaced from the pressing portion to define a clipping gap therebetween; and a third coupler including: a bottom horizontal extension extending in a horizontal direction and protruding from a bottom of the body in a front direction; and a guide portion extending from the bottom horizontal extension at a predetermined angle relative to the bottom horizontal extension, such that an upper portion of the guide portion and the bottom horizontal extension define a protrusion receiving portion.

10 Claims, 8 Drawing Sheets

(56) References Cited

U.S. PATENT DOCUMENTS

| | | | | |
|---|---|---|---|---|
| 6,126,125 | A * | 10/2000 | Dalton | G09F 3/204 248/205.2 |
| 2005/0035075 | A1* | 2/2005 | Walker | A47F 5/005 211/119.003 |
| 2013/0008065 | A1* | 1/2013 | Danielson | G09F 23/06 40/606.01 |
| 2021/0097897 | A1* | 4/2021 | Sisko | A47F 5/0869 |

FOREIGN PATENT DOCUMENTS

| | | |
|---|---|---|
| KR | 20-2012-0000330 U | 1/2012 |
| KR | 10-1250264 B | 4/2013 |
| KR | 20-0488700 Y1 | 3/2019 |

OTHER PUBLICATIONS

Korean Notice of Allowance dated Nov. 19, 2020, in connection with corresponding Korean Patent Application No. 10-2019-0115325.

Notice of Reasons for Refusal dated Jun. 10, 2022, in connection with corresponding Japanese Patent Application No. 2020-156132, along with English machine translation.

\* cited by examiner

Prior Art

Prior Art

Prior Art

ELECTRONIC LABEL DEVICE HOLDER

CROSS-REFERENCE TO RELATED APPLICATIONS

This application claims the priority of Korean Patent Application No. 10-2019-0115325 filed on Sep. 19, 2019, in the Korean Intellectual Property Office, the disclosure of which is hereby incorporated by reference in its entirety.

BACKGROUND

1. Field

The present disclosure relates to an electronic label device holder.

2. Description of Related Art

In stores such as large malls, many articles on sale are displayed on article display stands. In this connection, a label indicating article information such as a name, a price, and a shelf life is attached on the article display stand. Thus, a customer may identify the article information.

In stores in which article distribution is fast, displayed articles are sold quickly, and thus, information on an article on indicated on the label must be changed frequently. Therefore, an electronic label device that may easily change the information about the article displayed on the label and may be used repeatedly is often used in stores. To attach the electronic label device to a shelf of the article display stand, an electronic label device holder is used.

FIG. 1 is a side elevation view showing an electronic label device holder and an electronic label device coupled thereto according to a prior art.

FIG. 2 is a side elevation view showing a process of combining the electronic label device holder and the electronic label device according to the prior art with each other.

FIG. 3 is a side elevation view showing a state in which the electronic label device holder and the electronic label device according to the prior art are combined with each other.

Referring to FIG. 1 to FIG. 3, an electronic label device holder 10 according to the prior art includes a body 11, a first coupler 12 and a second coupler 13.

Further, an electronic label device 20 according to a prior art includes a body 21, a first coupled protrusion 22 and a second coupled protrusion 23.

The body 21 of the electronic label device 20 includes a controller and a display. When the controller receives article information via communication, etc., the controller controls the display to display the information thereon. The display displays the article information according to a command from the controller.

The electronic label device 20 is coupled to the electronic label device holder 10 via the first coupled protrusion 22 and the second coupled protrusion 23 thereof. When the electronic label device holder 10 and the electronic label device 20 are combined with each other, the first coupler 22 of the electronic label device 20 is coupled to the first coupler 12 of the electronic label device holder 10, and then the second coupled protrusion 23 of the electronic label device 20 is coupled to the second coupler 13 of the electronic label device holder 10. In this connection, each of ends of the first coupler 12 and the second coupler 13 has a hook shape, thereby preventing the first coupled protrusion 22 and the second coupled protrusion 23 from being separated therefrom.

However, this structure has following shortcomings. When a user applies a force to separate the electronic label device 20 from the electronic label device holder 10, the electronic label device 20 is not easily separated from the electronic label device holder 10 because the first coupled protrusion 22 and the second coupled protrusion 23 are caught at the hook-shaped ends of the first coupler 12 and the second coupler 13. Therefore, in order for the user to separate the electronic label device 20 from the electronic label device holder 10, the user have to apply a force using a special lever constructed to separate the electronic label device 20 therefrom. That is, there is a problem that the user may not easily separate the electronic label device 20 from the electronic label device holder 10.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide an electronic label device holder that may stably retain an electronic label device.

Further, a purpose of the present disclosure is to provide an electronic label device holder that allows an user to easily detach the electronic label device therefrom without using additional tool.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides an electronic label device holder for holding an electronic label device, the device comprising: a body having a rectangular plate-like structure extending in a horizontal direction; a first coupler including: a top horizontal extension extending in a horizontal direction and protruding from a top of the body in a front direction; and a pressing portion extending from a front end of the top horizontal extension in a front direction at a predetermined curvature; a second coupler disposed below the first coupler and extending in a horizontal direction and protruding from a top of the body in a front direction, wherein the second coupler is spaced from the pressing portion by a predetermined spacing to define a clipping gap therebetween; and a third coupler including: a bottom horizontal extension extending in a horizontal direction and protruding from a bottom of the body in a front direction having a curved cross section; and a guide portion extending from a front end of the bottom horizontal extension at a predetermined angle relative to the bottom horizontal extension, such that an upper portion of the guide portion and the bottom horizontal extension define a protrusion receiving portion.

In one implementation, when the electronic label device holder and the electronic label device are combined with each other, the clipping gap accommodates therein a first coupled protrusion formed at a top of a rear face of the electronic label device.

In one implementation, when the first coupled protrusion enters or exits the clipping gap, the first coupler moves in a first direction and the second coupler moves in a second direction opposite to the first direction, thereby increasing a spacing between the pressing portion and the second coupler.

In one implementation, the first coupled protrusion has a curvature corresponding to a curvature of the pressing portion, so that the first coupled protrusion moves along a curved surface of the pressing portion.

In one implementation, when the electronic label device holder and the electronic label device are combined with each other, a second coupled protrusion formed at a bottom of a rear face of the electronic label device is seated on the protrusion receiving portion.

In one implementation, when the second coupled protrusion is seated on or is removed from the protrusion receiving portion, the second coupled protrusion moves along an inclined surface of the predetermined angle of the guide portion.

In one implementation, when the second coupled protrusion is seated on or is removed from the protrusion receiving portion, the second coupled protrusion moves along the inclined surface of the guide portion while the third coupler moves in a second direction.

In one implementation, when the electronic label device holder and the electronic label device are combined with each other, the upper portion of the guide portion prevents the second coupled protrusion from being removed from the protrusion receiving portion.

In one implementation, while the electronic label device holder and the electronic label device are combined with each other, the electronic label device pivots around the pressing portion such that the clipping gap accommodates therein a first coupled protrusion formed at a top of a rear face of the electronic label device, and then a second coupled protrusion formed at a bottom of the rear face of the electronic label device is seated on the protrusion receiving portion.

In one implementation, while the electronic label device holder and the electronic label device are separated from each other, the electronic label device pivots around the pressing portion such that the second coupled protrusion is removed from the protrusion receiving portion, and then, the first coupled protrusion is removed from the clipping gap.

Effects in accordance with the present disclosure may be as follows but may not be limited thereto.

The electronic label device may be stably coupled to the electronic label device holder according to the present disclosure.

Further, the electronic label device holder according to the present disclosure may allow the user to easily remove the electronic label device therefrom without using additional tool.

Moreover, the effect of the present disclosure is not limited to the above effects. It should be understood to include all possible effects derived from descriptions of the present disclosure or a configuration as set forth in the claims.

DETAILED DESCRIPTIONS

Figure 1:
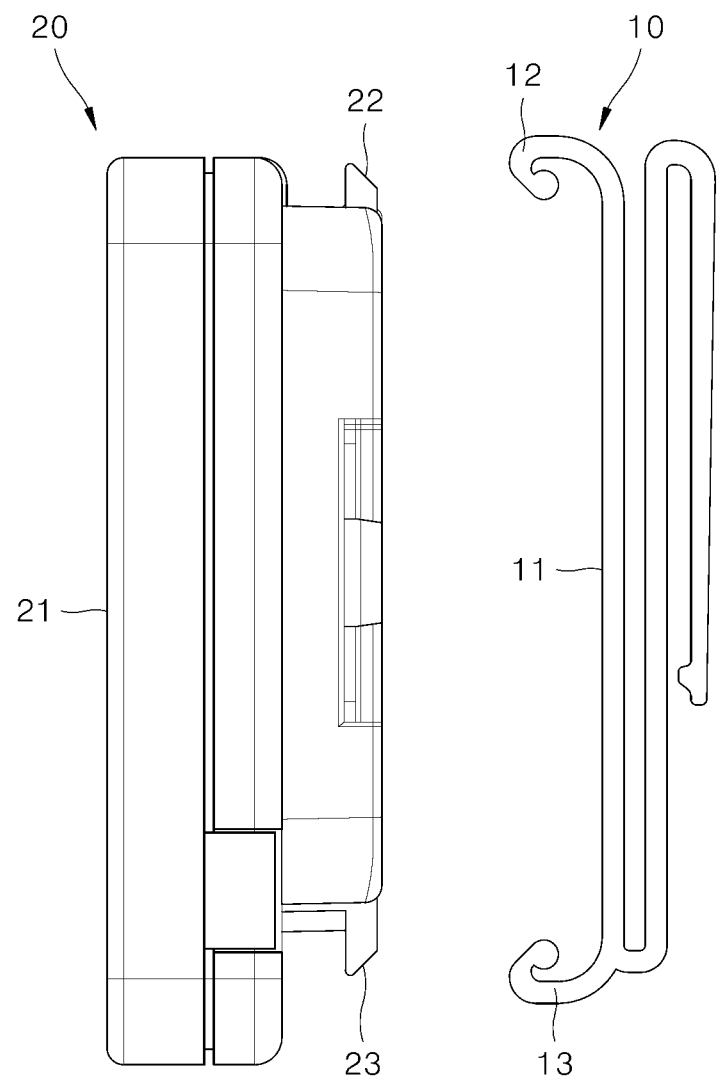
FIG. 1 is a side elevation view showing an electronic label device holder and an electronic label device coupled thereto according to the prior art.
Figure 2:
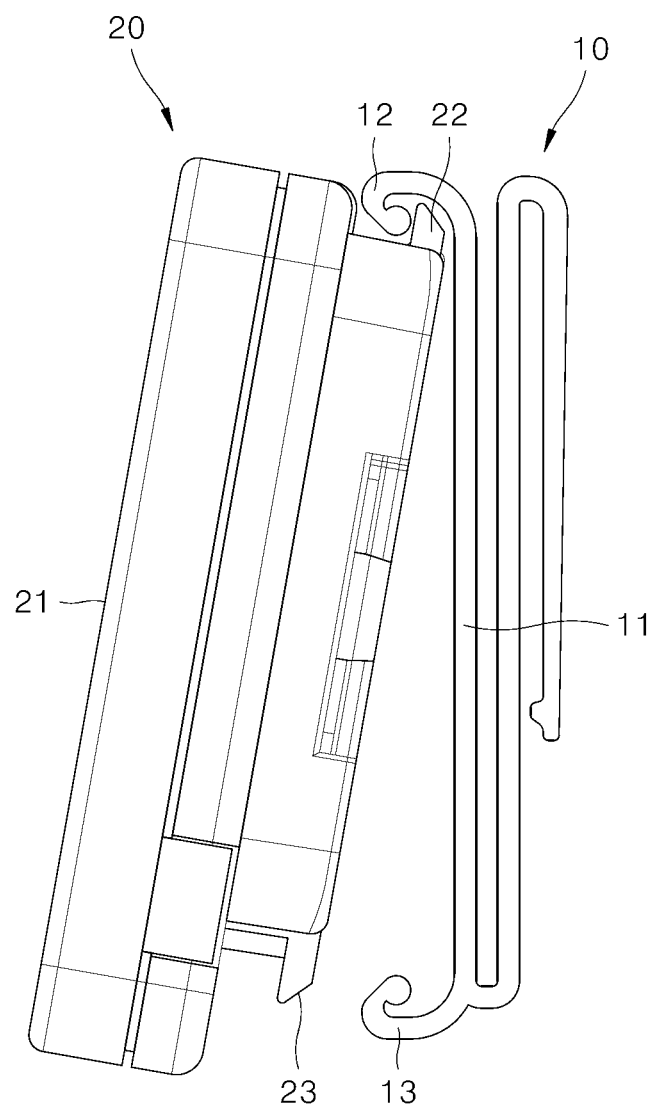
FIG. 2 is a side elevation view showing a process of combining the electronic label device holder and the electronic label device according to the prior art with each other.
Figure 3:
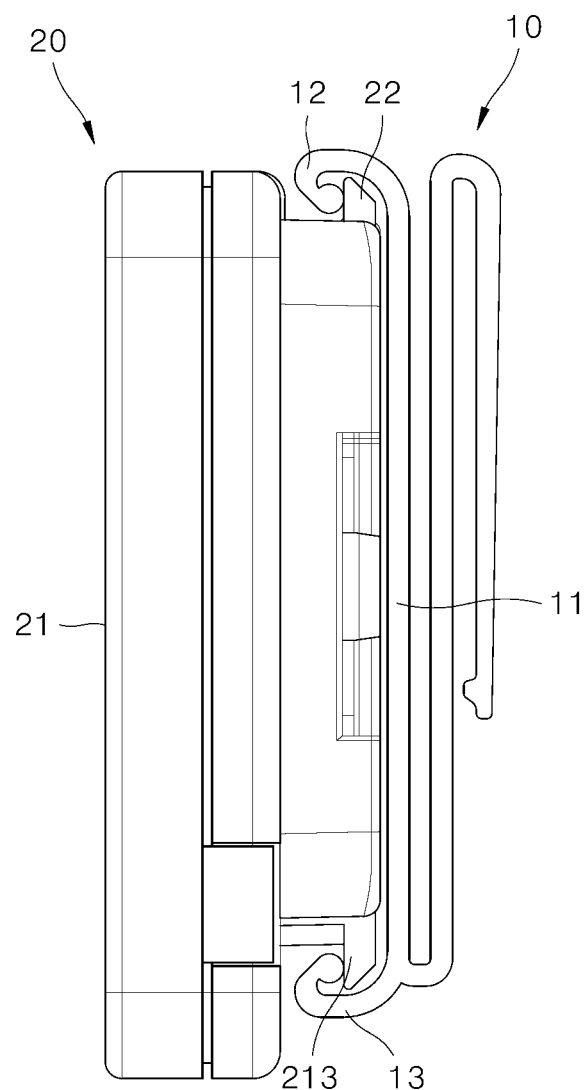
FIG. 3 is a side elevation view showing a state in which the electronic label device holder and the electronic label device according to the prior art are combined with each other.

For simplicity and clarity of illustration, elements in the figures. are not necessarily drawn to scale. The same reference numbers in different figures. denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
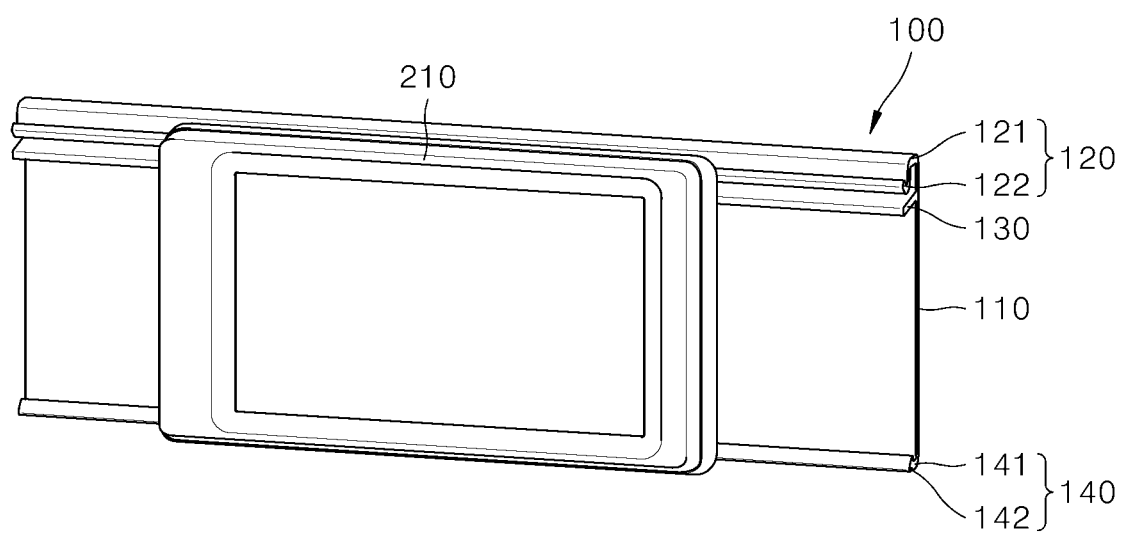
FIG. 4 is a perspective view showing a combination between an electronic label device holder and an electronic label device according to an embodiment of the present disclosure.

FIG. 4 is a perspective view showing a combination between an electronic label device holder and an electronic label device according to an embodiment of the present disclosure.

Figure 5:
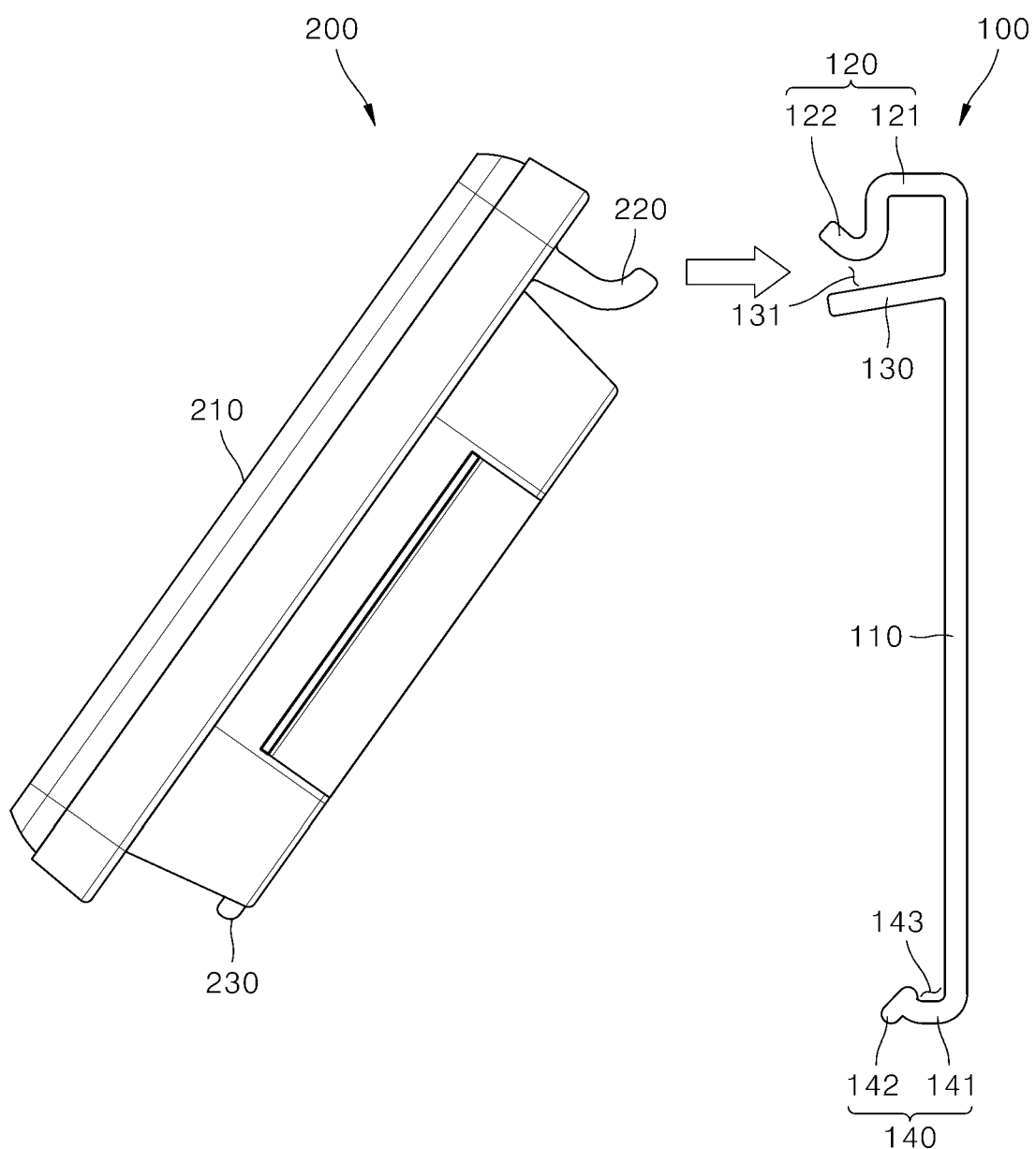
FIG. 5 is a side elevation view showing an electronic label device holder and an electronic label device coupled thereto according to an embodiment of the present disclosure.

FIG. 5 is a side elevation view showing an electronic label device holder and an electronic label device coupled thereto according to an embodiment of the present disclosure.

Referring to FIG. 4 and FIG. 5, an electronic label device 200 to be coupled to the electronic label device holder 100 according to an embodiment of the present disclosure includes a body 210, a first coupled protrusion 220 and a second coupled protrusion 230.

The body 210 includes a controller (not shown) and a display (not shown). When the controller receives article information through communication, etc., the controller controls the display to display the same thereon. The display displays the article information according to a command from the controller.

The first coupled protrusion 220 is formed at a rear portion of the electronic label device 200. In this connection, the first coupled protrusion 220 is formed to protrude from a top of the body 210 rearwards. The first coupled protrusion 220 is formed to have a curvature corresponding to a curvature of a pressing portion 122 of the electronic label device holder 100 to be described later.

The second coupled protrusion 230 is formed at a rear portion of the electronic label device 200. In this connection, the second coupled protrusion 230 is formed to protrude from a rear face of the body 210 downwardly. The second coupled protrusion 230 is formed to have a curved cross section.

The electronic label device 200 may be coupled to the electronic label device holder 100 while moving in a direction as indicated by an arrow shown in FIG. 5.

The electronic label device holder 100 according to one embodiment of the present disclosure includes a body 110, a first coupler 120, a second coupler 130 and a third coupler 140.

The body 110 has a rectangular plate-like structure extending in a horizontal direction. When the electronic label device holder 100 and the electronic label device 200 are combined with each other, a front surface of the body 110 may contact the body of the electronic label device 200.

A rear surface of the body 110 may partially contact the front surface of an article display stand. Double-sided adhesive or a magnet may be attached to a rear surface of the body 110, and the electronic label device holder 100 may be fixed to the article display stand using the double-sided adhesive or the magnet. Alternatively, screws may be mounted to the rear surface of the body 110, and the electronic label device holder 100 may be fixed to the article display stand using the screws.

The first coupler 120 includes a top horizontal extension 121 and the pressing portion 122. In this connection, the first coupler 120 is made of an elastic material. Therefore, when the electronic label device holder 100 and the electronic label device 200 are combined with each other, the first coupler 120 may move in a first direction "a". When the electronic label device holder 100 and the electronic label device 200 are separated from each other, the first coupler 120 may return to its original position. This allows the user to combine the electronic label device 200 and the electronic label device holder 100 with each other using smaller force.

The top horizontal extension 121 protrudes from a top of the body 110 in a forward direction. The top horizontal extension 121 may have a plate-like structure extending in a horizontal direction.

The pressing portion 122 may extend from a distal end of the top horizontal extension 121 in a forward direction. In this connection, the pressing portion 122 has a curved shape having a predetermined curvature. Thus, the pressing portion 122 has the curved shape, and the first coupled protrusion 220 has a curvature corresponding to a curvature of the pressing portion 122. In this case, when the electronic label device holder 100 and the electronic label device 200 are engaged with each other, the pressing portion 122 guides movement of the first coupled protrusion 220 of the electronic label device 200.

Further, the pressing portion 122 may have a downwardly curved shape. When the pressing portion 122 has the downwardly curved shape, the pressing portion 122 applies a pressure to the first coupled protrusion 220. Thus, the electronic label device holder 100 and the electronic label device 200 are stably combined with each other.

The second coupler 130 protrudes from the top of the body in a front direction. The second coupler 130 may have a planar plate shape extending in a horizontal direction. In this connection, a length by which the second coupler 130 protrudes from the body may be set to be equal to or slightly different from a spacing between a distal end of the pressing portion 122 of the first coupler 120 and the body 110. This is because when the length by which the second coupler 130 protrudes from the body is much larger or smaller than the spacing between a distal end of the pressing portion 122 of the first coupler 120 and the body 110, the electronic label device 200 may not be stably combined with the electronic label device holder 100.

The second coupler 130 is made of an elastic material. Therefore, when the electronic label device holder 100 and the electronic label device 200 are combined with each other, the second coupler 130 may move in a second direction "b". When the electronic label device holder 100 and the electronic label device 200 are separated from each other, the second coupler 130 may return to its original position. This allows the user to combine the electronic label device 200 and the electronic label device holder 100 with each other using smaller force.

When the electronic label device holder 100 and the electronic label device 200 are joined with each other, the second coupler 130 along with the pressing portion 122 guides the movement of the first coupled protrusion 220 of the electronic label device 200.

The second coupler 130 may be spaced from the pressing portion 122 by a predefined spacing to define a clipping gap 131 therebetween.

The clipping gap 131 accommodates therein the first coupled protrusion 220 when the electronic label device holder 100 and the electronic label device 200 are joined with each other. In this connection, a vertical dimension of the clipping gap 131 may be equal to the predetermined spacing when the electronic label device holder 100 and the electronic label device 200 are separated from each other. However, the vertical dimension of the clipping gap 131 may vary as the first coupler 120 and the second coupler 130 move elastically when the electronic label device holder 100 and the electronic label device 200 are combined with each other. This allows the user to combine the electronic label device 200 and the electronic label device holder 100 with each other using smaller force.

The third coupler 140 includes a bottom horizontal extension 141 and a guide portion 142. The third coupler 140 is made of an elastic material. Therefore, when the electronic label device holder 100 and the electronic label device 200 are combined with each other, the third coupler 140 may move in the second direction "b". When the electronic label device holder 100 and the electronic label device 200 are separated from each other, the third coupler 140 may return to its original position. This allows the user to combine the electronic label device 200 and the electronic label device holder 100 with each other using smaller force.

The bottom horizontal extension 141 protrudes from a bottom of the body in a front direction. The bottom horizontal extension 141 has a curved cross section. In this connection, the bottom horizontal extension 141 may have a downwardly curved shape.

The guide portion 142 is connected to the bottom horizontal extension 141 at a predetermined angle therewith. The guide portion 142 extends at a predetermined angle relative to the bottom horizontal extension 141 to have an inclined surface. The guide portion 142 may have a plate-like structure extending in a horizontal direction and having rounded corners.

A combination of the guide portion 142 and the bottom horizontal extension 141 forms a protrusion receiving portion 143. The protrusion receiving portion 143 receives thereon the second coupled protrusion 230 when the electronic label device holder 100 and the electronic label device 200 are combined with each other. In this connection, the guide portion 142 may prevent the second coupled protrusion 230 seated on the protrusion receiving portion 143 from escaping from the protrusion receiving portion 143.

However, since the third coupler 140 has elasticity, the user may move the third coupler 140 in the second direction "b" with little force. When the third coupler 140 moves in the second direction "b", the guide portion 142 may no longer prevent the second coupled protrusion 230 from escaping from the protrusion receiving portion 143. This allows the user to easily separate the electronic label device holder 100 and the electronic label device 200 from each other without using additional tool.

Figure 6:
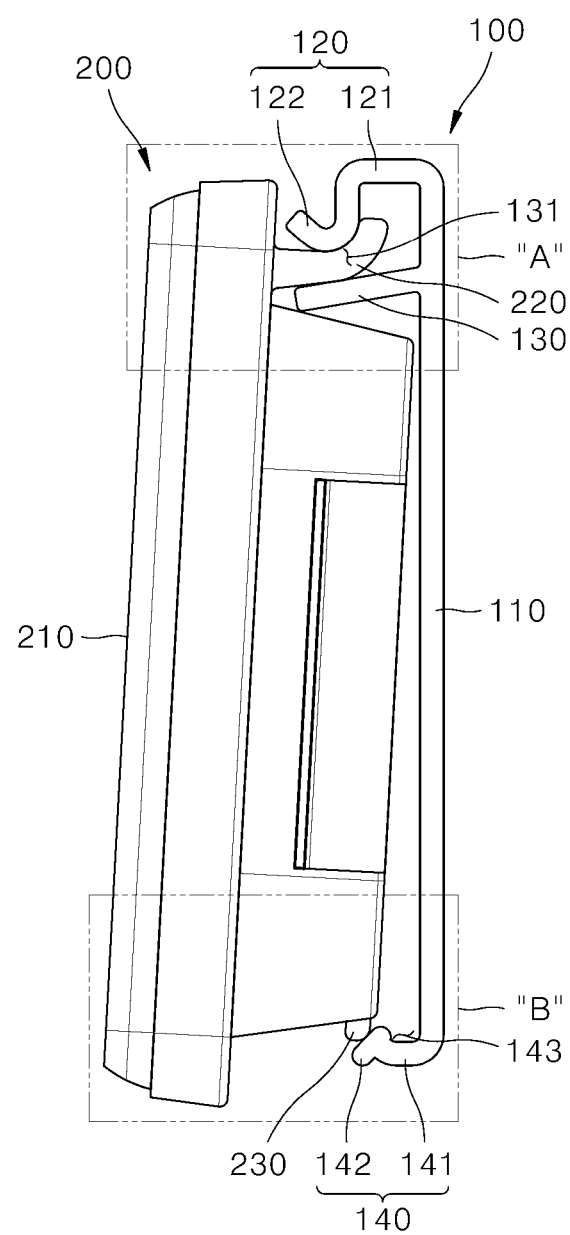
FIG. 6 is a side elevation view showing a process in which an electronic label device holder and an electronic label device are combined with each other or are separated from each other according to an embodiment of the present disclosure.

FIG. 6 is a side elevation view showing a process in which the electronic label device holder and the electronic label device according to an embodiment of the present disclosure are combined with or separated from each other.

Referring to FIG. 6, when the first coupled protrusion 220 of the electronic label device 200 enters the clipping gap 131 of the electronic label device holder 100 and the second coupled protrusion 230 of the electronic label device 200 is seated on the protrusion receiving portion 143 of the electronic label device holder 100, the electronic label device 200 is coupled to the electronic label device holder 100.

When the second coupled protrusion 230 of the electronic label device 200 escapes from the protrusion receiving portion 143 of the electronic label device holder 100, while the first coupled protrusion 220 of the electronic label device 200 escapes from the clipping gap 131 of the electronic label device holder 100, the electronic label device 200 is separated from the electronic label device holder 100.

Figure 7:
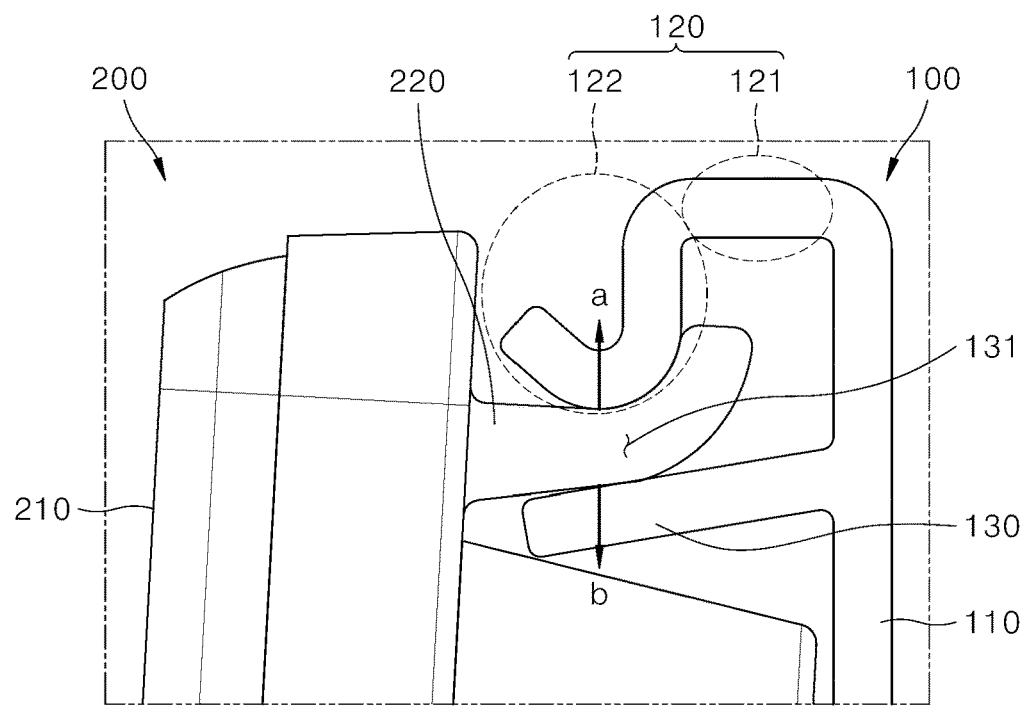
FIG. 7 is an enlarged view of FIG. 6 in which a first coupled protrusion enters a clipping gap or the first coupled protrusion escapes from the clipping gap.

A process in which the first coupled protrusion 220 of the electronic label device 200 enters the clipping gap 131 of the electronic label device holder 100 and escapes from the clipping gap 131 is shown in more detail in FIG. 7.

FIG. 7 is an enlarged view of FIG. 6 in which the first coupled protrusion enters the clipping gap or the first coupled protrusion escapes from the clipping gap.

Referring to FIG. 7, the first coupled protrusion 220 enters or exits the clipping gap 131 along a path defined by the pressing portion 122 and the second coupler 130.

When the first coupled protrusion 220 enters the clipping gap 131, the first coupler 120 moves in the first direction "a" via elasticity. At the same time, the second coupler 130 moves in the second direction "b" via elasticity. Thus, a spacing between the pressing portion 122 and the second coupler 130 increases. Thus, the first coupled protrusion 220 may easily enter the clipping gap 131.

Since the first coupled protrusion 220 is formed to have the curvature corresponding to the curvature of the pressing portion 122, the first coupled protrusion 220 enters the clipping gap 131 while moving along the curved face of the pressing portion 122.

Conversely, when the first coupled protrusion 220 escapes from the clipping gap 131, the first coupler 120 moves in the first direction "a" via elasticity. At the same time, the second coupler 130 moves in the second direction "b" via elasticity. Thus, the spacing between the pressing portion 122 and the second coupler 130 increases. Thus, the first coupled protrusion 220 may be easily disengaged from the clipping gap 131.

Since the first coupled protrusion 220 is formed to have the curvature corresponding to the curvature of the pressing portion 122, the first coupled protrusion 220 may escape away from the clipping gap 131 while moving along the curved surface of the pressing portion 122.

Figure 8:
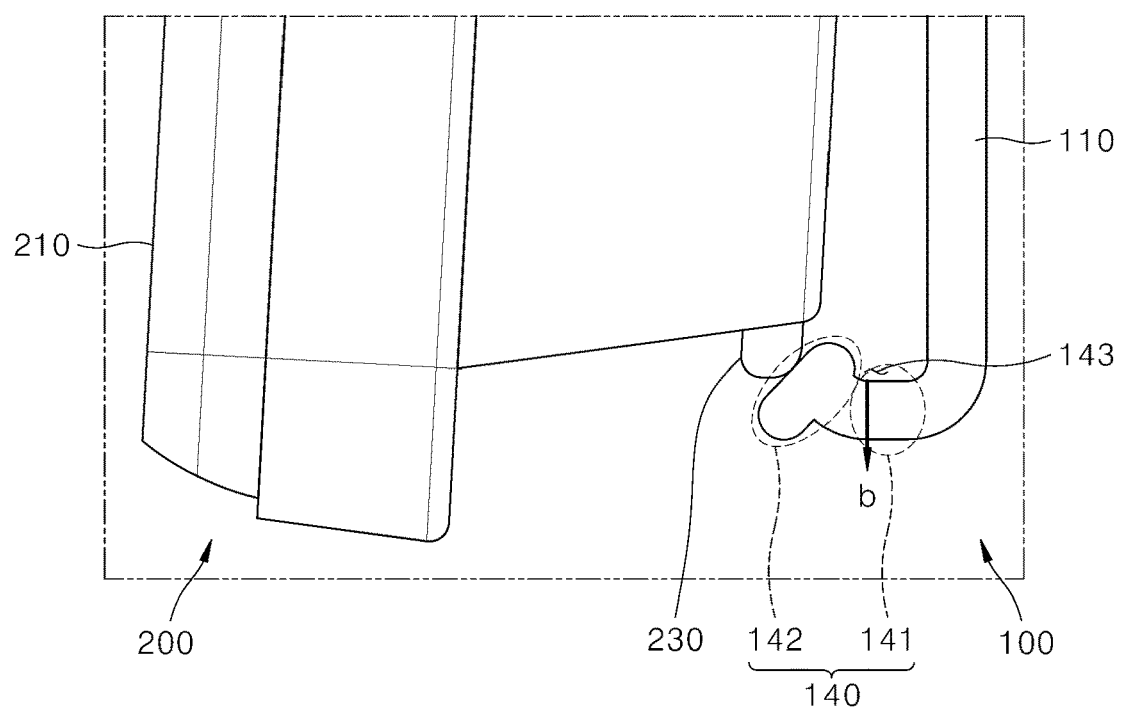
FIG. 8 is an enlarged view of FIG. 6 in which a second coupled protrusion is seated on a protrusion receiving portion or the first coupled protrusion escapes from a protrusion receiving portion.

Returning to FIG. 6 again, a process in which the second coupled protrusion 230 of the electronic label device 200 is seated onto the protrusion receiving portion 143 of the electronic label device holder 100 and escapes from the protrusion receiving portion 143 is shown in more detail in FIG. 8.

FIG. 8 is an enlarged view of FIG. 6 in which the second coupled protrusion is seated onto the protrusion receiving portion or the first coupled protrusion escapes from the protrusion receiving portion.

When the second coupled protrusion 230 is seated onto the protrusion receiving portion 143, the third coupler 140 moves in the second direction "b" via elasticity. Accordingly, the second coupled protrusion 230 is seated onto the protrusion receiving portion 143 while moving along the inclined surface of the guide portion 142. Thus, as the third coupler 140 moves in the second direction "b", the second coupled protrusion 230 may be easily seated on the protrusion receiving portion 143.

Conversely, when the second coupled protrusion 230 escapes from the protrusion receiving portion 143, the third coupler 140 moves in the second direction "b" via elasticity. Accordingly, the second coupled protrusion 230 may be separated from the protrusion receiving portion 143 while moving along the inclined surface of the guide portion 142. As such, as the third coupler 140 moves in the second direction "b", the second coupled protrusion 230 may be easily detached from the protrusion receiving portion 143.

Returning to FIG. 6 again, when the electronic label device holder 100 and the electronic label device 200 are combined with each other, the device 200 is coupled to the electronic label device holder 100 while the electronic label device 200 pivots. In this connection, while the electronic label device 200 pivots, the first coupled protrusion 220 is first accommodated in the clipping gap 131. Then, the second coupled protrusion 230 is seated on the protrusion receiving portion 143.

Conversely, when the electronic label device holder 100 and the electronic label device 200 are separated from each other, the electronic label device 200 is separated from the electronic label device holder 100 while the device 200 pivots. In this connection, the electronic label device 200 pivots around the pressing portion, so that the second coupled protrusion 230 is first removed from the protrusion receiving portion 143 and then the first coupled protrusion 220 is removed from the clipping gap 131.

In this manner, the electronic label device holder 100 and the electronic label device 200 are combined with or separated from each other. Thus, the user may easily remove the electronic label device 200 from the electronic label device holder 100 without using additional tool.

Figure 9:
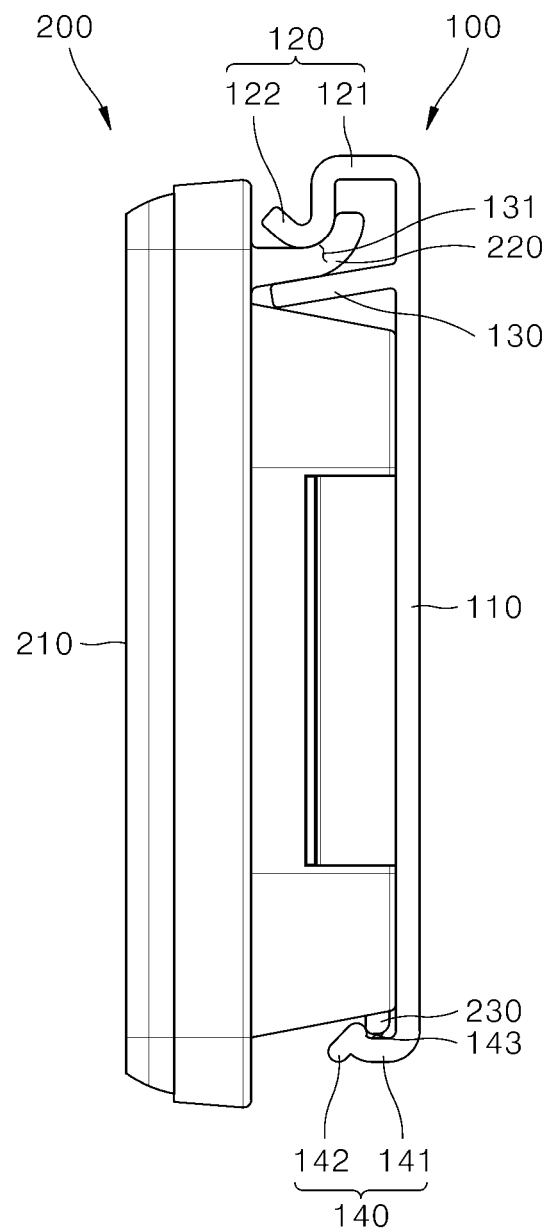
FIG. 9 is a side elevation view showing a combination between an electronic label device holder and an electronic label device according to an embodiment of the present disclosure.

FIG. 9 is a side elevation view showing the combination between the electronic label device holder and the electronic label device according to an embodiment of the present disclosure.

Referring to FIG. 9, it may be seen that in a state where the electronic label device holder 100 and the electronic label device 200 are combined with each other, the first coupled protrusion 220 of the electronic label device 200 is accommodated in the clipping gap 131 defined by the pressing portion 122 and the second coupler 130. In this connection, the downwardly convex portion of the pressing portion 122 applies the pressure to the first coupled protrusion 220. Thus, the electronic label device holder 100 and the electronic label device 200 are stably combined with each other.

Further, it may be seen that in the state where the electronic label device holder 100 and the electronic label device 200 are combined with each other, the second coupled protrusion 230 of the electronic label device 200 is seated on the protrusion receiving portion 143. The guide portion 142 may prevent the second coupled protrusion 230 supported on the protrusion receiving portion 143 from escaping from the protrusion receiving portion 143. However, because the third coupler 140 has elasticity, the user applies a smaller force to move the third coupler 140 in the second direction "b". Thus, the guide portion 142 may no longer prevent the second coupled protrusion 230 from escaping from the protrusion receiving portion 143. This allows the user to easily separate the electronic label device holder 100 and the electronic label device 200 from each other without using additional tool.

The present disclosure as described above may be subjected to various substitutions, modifications, and changes within the scope of the present disclosure without departing from the technical spirit of the present disclosure by a person having ordinary knowledge in the technical field to which the present disclosure belongs. Thus, the disclosure is not limited to the accompanying drawings.

What is claimed is:

1. An electronic label device holder for holding an electronic label device, the device comprising:
   a body having a rectangular plate-like structure extending in a horizontal direction;
   a first coupler including:
     a top horizontal extension extending in a horizontal direction and protruding from a top of the body in a front direction; and
     a pressing portion extending from a front end of the top horizontal extension in a front direction at a predetermined curvature;
   a second coupler disposed below the first coupler and extending in a horizontal direction and protruding from a top of the body in a front direction, wherein the second coupler is spaced from the pressing portion by a predetermined spacing to define a clipping gap therebetween; and
   a third coupler including:
     a bottom horizontal extension extending in a horizontal direction and protruding from a bottom of the body in a front direction having a curved cross section; and
     a guide portion extending from a front end of the bottom horizontal extension at a predetermined angle relative to the bottom horizontal extension, such that an upper portion of the guide portion and the bottom horizontal extension define a protrusion receiving portion.

2. The electronic label device holder of claim 1, wherein when the electronic label device holder and the electronic label device are combined with each other, the clipping gap accommodates therein a first coupled protrusion formed at a top of a rear face of the electronic label device.

3. The electronic label device holder of claim 2, wherein when the first coupled protrusion enters or exits the clipping gap, the first coupler moves in a first direction and the second coupler moves in a second direction opposite to the first direction, thereby increasing a spacing between the pressing portion and the second coupler.

4. The electronic label device holder of claim 2, wherein the first coupled protrusion has a curvature corresponding to a curvature of the pressing portion, so that the first coupled protrusion moves along a curved surface of the pressing portion.

5. The electronic label device holder of claim 1, wherein when the electronic label device holder and the electronic label device are combined with each other, a second coupled protrusion formed at a bottom of a rear face of the electronic label device is seated on the protrusion receiving portion.

6. The electronic label device holder of claim 5, wherein when the second coupled protrusion is seated on or is removed from the protrusion receiving portion, the second coupled protrusion moves along an inclined surface of the predetermined angle of the guide portion.

7. The electronic label device holder of claim 6, wherein when the second coupled protrusion is seated on or is removed from the protrusion receiving portion, the second coupled protrusion moves along the inclined surface of the guide portion while the third coupler moves in a second direction.

8. The electronic label device holder of claim 5, wherein when the electronic label device holder and the electronic label device are combined with each other, the upper portion of the guide portion prevents the second coupled protrusion from being removed from the protrusion receiving portion.

9. The electronic label device holder of claim 1, wherein while the electronic label device holder and the electronic label device are combined with each other, the electronic label device pivots around the pressing portion such that the clipping gap accommodates therein a first coupled protrusion formed at a top of a rear face of the electronic label device, and then a second coupled protrusion formed at a bottom of the rear face of the electronic label device is seated on the protrusion receiving portion.

10. The electronic label device holder of claim 9, wherein while the electronic label device holder and the electronic label device are separated from each other, the electronic label device pivots around the pressing portion such that the second coupled protrusion is removed from the protrusion receiving portion, and then, the first coupled protrusion is removed from the clipping gap.

* * * * *